Nov. 4, 1958    M. T. CICHELLI ET AL    2,859,155
PROCESS FOR VAPORIZING HYDROGEN PEROXIDE
BY CONVECTIVE DISTILLATION
Filed Dec. 27, 1955    4 Sheets-Sheet 1

INVENTORS
M. T. Cichelli
F. A. Gluckert

ATTORNEY

INVENTORS
M. T. Cichelli
F. A. Gluckert

ATTORNEY

Nov. 4, 1958

M. T. CICHELLI ET AL 2,859,155

PROCESS FOR VAPORIZING HYDROGEN PEROXIDE
BY CONVECTIVE DISTILLATION

Filed Dec. 27, 1955

4 Sheets-Sheet 4

INVENTORS
M. T. Cichelli
F. A. Gluckert

BY *Theodore T. Buchow*

ATTORNEY

United States Patent Office 2,859,155
Patented Nov. 4, 1958

2,859,155

PROCESS FOR VAPORIZING HYDROGEN PEROXIDE BY CONNECTIVE DISTILLATION

Mario T. Cichelli, Wilmington, Del., and Frank A. Gluckert, West Chester, Pa., assignors to E. I. du Pont de Nemours and Company, Wilmington, Del., a corporation of Delaware Application December 27, 1955, Serial No. 555,411

8 Claims. (Cl. 202—46)

This invention relates to a process and apparatus for vaporizing hydrogen peroxide solutions.

For various purposes, hydrogen peroxide aqueous solutions heretofore have been vaporized by boiling in conventional stills, with or without distilling columns, by the falling film method and by spraying solution onto heated surfaces. Such methods tend to cause considerable decomposition of the hydrogen peroxide and operation at subatmospheric pressure is required to minimize decomposition. Some of these methods depend on separation of the hydrogen peroxide vapors from liquid condensate or unvaporized material, thus requiring recovery and reworking of such liquid by-products. Other methods cause the deposition of any salts dissolved in the peroxide solutions, e. g., stabilizer salts, on solid surfaces in the vaporizer equipment, requiring periodic interruptions to remove such deposits.

An object of the present invention is to completely vaporize hydrogen peroxide solution with a minimum of decomposition and so as to provide hydrogen peroxide vapor of regulated strength. Another object is to efficiently vaporize hydrogen peroxide at or above atmospheric pressure. A further object is to vaporize hydrogen peroxide solutions containing stabilizer salts in solution, substantially without accumulation of salt deposits in the vaporizing equipment. Still other objects will be apparent from the following description of the invention.

Figure 1:
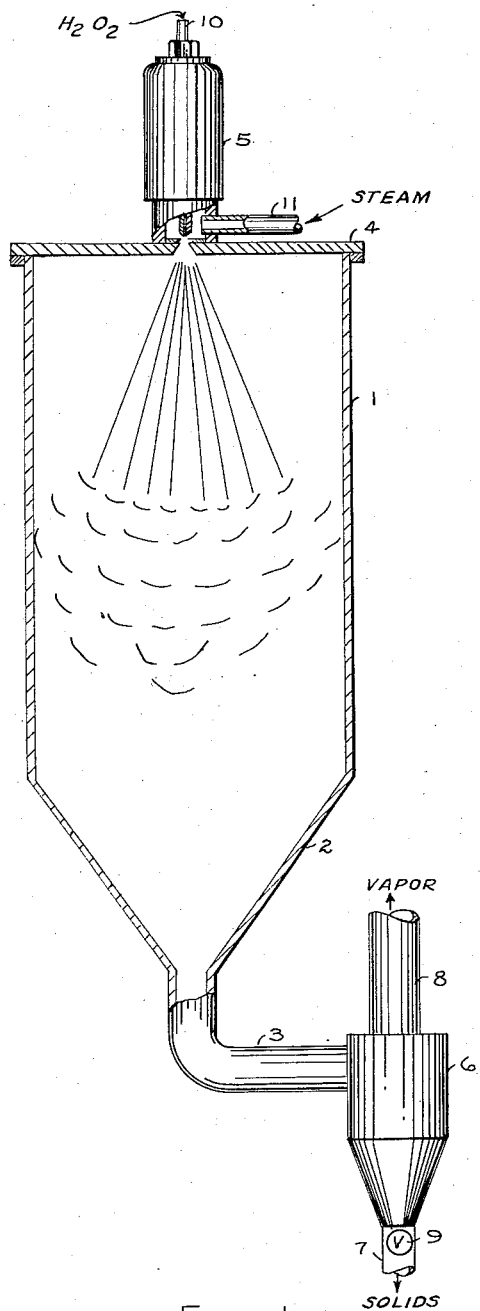
Figure 2:
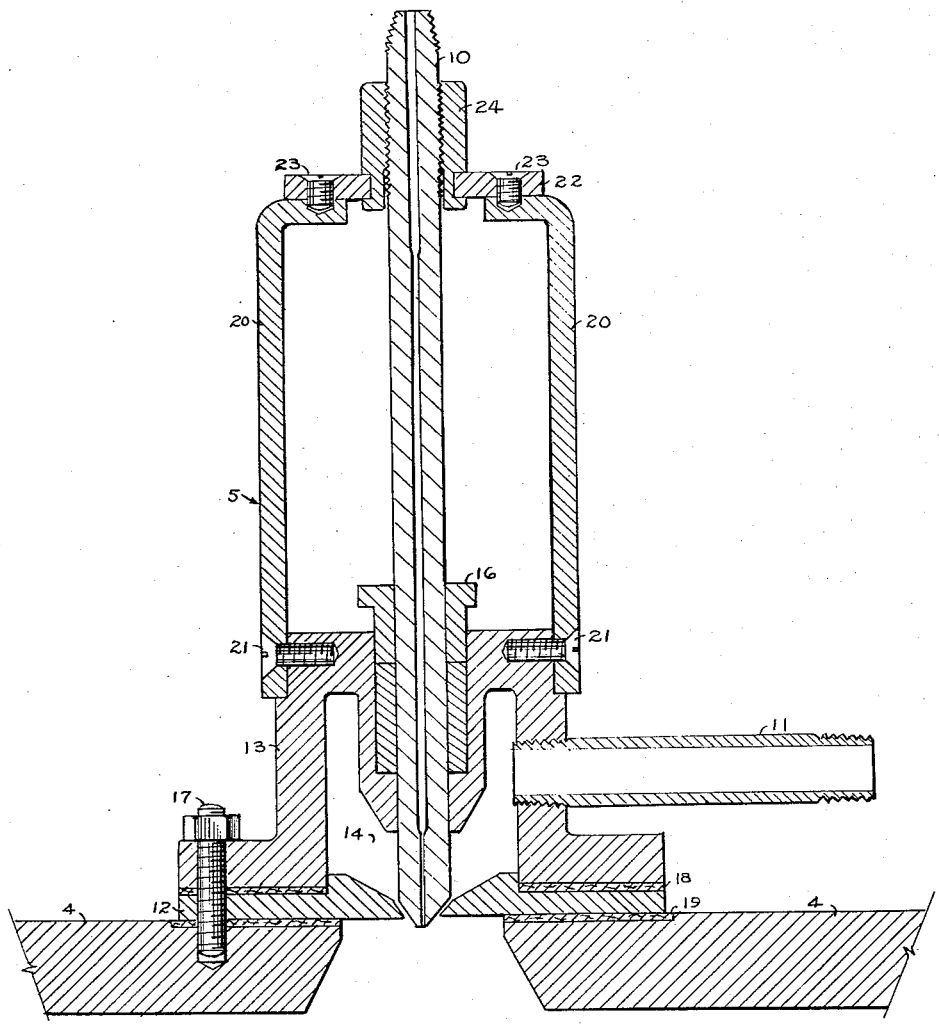
Figure 3:
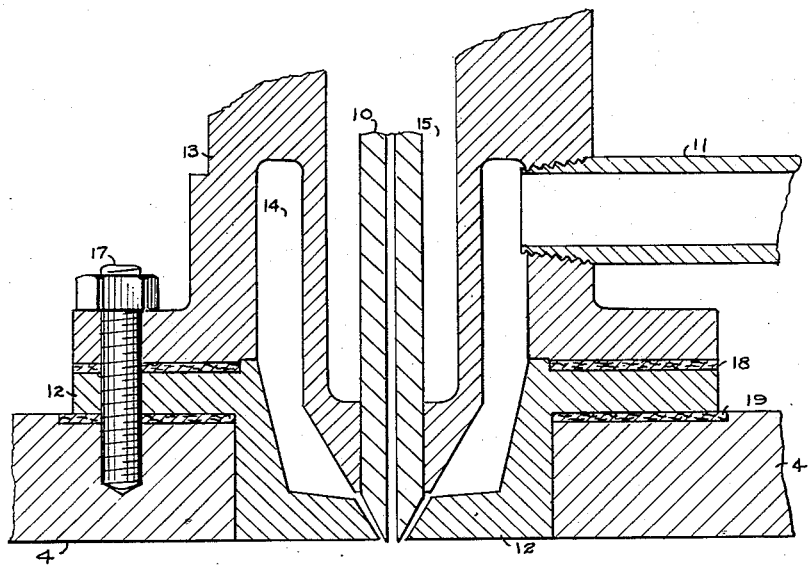
Figure 4:
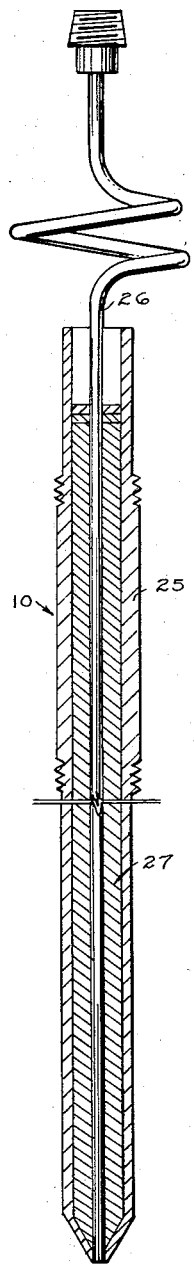

The appended drawings illustrate one form of apparatus for practicing the present invention. Figure 1 is in part a vertical cross-section, and in part an elevation, of a vaporizer. Figure 2 is a vertical section of the atomizing device of Figure 1. Figure 3 is a vertical section illustrating a modification of the atomizing device. Figure 4 is a vertical section of a modified liquid inlet pipe for the atomizing device.

The above objects are attained in accordance with the present invention by atomizing a stream of liquid hydrogen peroxide solution in contact with a hot gas which has a sufficient heat content to completely vaporize the peroxide, under such conditions that hydrogen peroxide in the liquid state does not contact any solid surface while at a temperature at or above its boiling point. Preferably the vapors thus produced are contacted only with surfaces, such as the interior of pipes, containers, etc. which are at temperatures above the condensation point until the vapor is brought to the desired point of use, or if desired, is rapidly cooled to condense it to a peroxide solution of increased purity.

One mode of practicing the invention is illustrated by the appended drawings. The vaporizer illustrated by Figure 1 has a hollow cylindrical shell or container 1 having a conical bottom 2 terminating in outlet pipe 3. Shell 1 is surmounted by a cover 4 which has a circular opening in the center and is surmounted with an atomizing device 5. Outlet pipe 3 leads into the side of a conventional cyclone separator 6 which is provided with vapor effluent pipe 8 and solids effluent pipe 7, the latter being provided with a valve 9.

Figures 2 and 3 show in detail alternate forms of atomizing device 5 attached to the vaporizer cover 4. The atomizing device is provided with liquid inlet pipe 10 and steam or gas inlet 11. Concentrically over the opening in the cover 4 is located orifice plate 12 which has a central opening of somewhat smaller diameter than that of the exterior diameter of inlet pipe 10. Casing 13 forms a steam or hot gas chamber 14 and also forms the outside casing of the stuffing box 15 which is filled with a suitable heat insulating packing such as asbestos fibers and is closed by a conventional gland 16. The assembly of casing 13 and orifice plate 12 is bolted to cover 4 by means of bolts 17, gaskets 18 and 19 being interposed to prevent leakage. The sleeve 20, which may be a hollow cylinder or a cage-like construction, is fastened to the top of casing 13 by means of screws 21. Annular plate 22, fastened to the top of sleeve 20 by means of screws 23, serves as a bearing for the grooved adjusting nut 24, which is threaded onto inlet pipe 10. Plate 22 is composed of two halves which fit into a groove in the lower portion of nut 24, whereby inlet pipe 10 is raised or lowered by turning nut 24. As the opening in orifice plate 12 is a little smaller than the outside diameter of pipe 10, the size of the annular space between the two may be varied by raising or lowering pipe 10.

The internal diameter of inlet pipe 10 is relatively small so as to obtain a relatively high velocity of liquid passing therethrough. As shown in Figure 2, pipe 10 has three different internal diameters the smallest diameter being at the bottom in the zone of the highest temperature. If desired the diameter may be the same throughout the length of tube 10.

Figure 4 shows another form of liquid inlet tube 10 which may be utilized in the apparatus of Figures 2 and 3. The liquid inlet tube of Figure 4 is constructed of an exterior tube 25 and concentrically arranged interior tube 26, the two tubes being fastened together (e. g., welded) at the tip. The space between tubes 25 and 26 is filled with an insulating material 27, such as asbestos fiber.

In operating the device of Figure 1 to vaporize the hydrogen peroxide solution, the hydrogen peroxide solution is fed in through inlet tube 10 while a hot gas, e. g., superheated steam, carrying the heat required to vaporize the peroxide solution is fed in through pipe 11. The annular opening between the tapered end of inlet tube 10 and the orifice plate 12 is adjusted by means of adjusting nut 24 so that the pressure applied to the steam or hot gas entering tube 11 causes it to flow through the annular opening at a high velocity in a conical jet, which causes atomization of the jet of hydrogen peroxide solution issuing from inlet tube 10. Preferably the annular jet of steam or hot gas is at sonic velocity. At the same time the velocity of the peroxide solution passing through inlet pipe 10, is such that substantially none of the liquid passing through is heated to its boiling point before it is atomized by contact with the conical jet of steam or hot gas. If desired, the liquid fed into pipe 10 may be pre-cooled to a temperature below normal room temperature (20 to 30° C.). It should be noted that the liquid jet issuing from pipe 10 is not atomized until it comes into contact with the jet of hot steam or gas. Thus, if the flow of hot steam or gas is stopped, the liquid jet from pipe 10 will strike the bottom of the vapor collecting chamber.

The temperature of the steam or hot gas is adjusted with relation to the relative rates of flow of the liquid and gas so that the steam or hot gas will carry into the vaporizer at least sufficient heat to completely vaporize the hydrogen peroxide solution fed therein. The atomization of the liquid stream converts the latter into small droplets which are rapidly and completely vaporized, so that, although these droplets travel from the point of atomization at a high rate of speed toward the interior walls of shell 1, each droplet is completely vaporized before it can come in contact with the wall. The temperature and heat content of the steam or hot gas must be sufficiently high to accomplish this rapidity of vaporization.

In this manner, no liquid having a temperature as high as its boiling point comes in contact with any solid surface, the liquid traveling through inlet tube 10 never reaching the boiling point until it has passed out of tube 10 and has become atomized; and the atomized droplets which are heated to the boiling point are completely vaporized before they can contact any solid surface.

The vaporization product is hydrogen peroxide vapor, diluted with the steam or hot gas utilized to provide the heat of vaporization; and this vapor mixture passes out through pipe 3 to any desired point of use or treatment. The temperature of the vapor passing out through pipe 3 will depend upon the temperature of the hot gas or steam utilized for the vaporization and the amount of liquid vaporized and may be at, or to any desired extent above, the boiling point of the hydrogen peroxide solution. Delivery pipe 3 and connections thereto may be insulated and, if desired, also heated, to prevent condensation until the vapor has come to the point of utilization.

Hydrogen peroxide solution generally contains some solid materials in solution which may be stabilizers such as pyrophosphates or tin compounds, or undersirable impurities. We have found that in vaporizing peroxide solutions containing such solid materials in accordance with the present invention, the solids occur in the vaporized product as an extremely finely divided suspension in the hot vapor. These solid suspensions may be removed from the vapor stream if desired by means of a cyclone separator, as illustrated in Figure 1, or by other well-known means for separating solids from gases such as bag filters, electrostatic precipitators or the like. In many cases it is desirable to retain such solid materials in the vapor stream to the point of condensation or of use, for example when the solid materials are peroxide stabilizers. We have found that the solids are so finely divided that the hot vapors can be transported for considerable distances through ordinary pipes with little or no precipitation of the solid material.

The vapor thus produced may be condensed to produce purified liquid hydrogen peroxide or it may be utilized for bleaching or for chemical reactions where the application of a hot hydrogen peroxide vapor is advantageous. If the hot vapor is condensed, the concentration of the peroxide in the condensate will depend upon the mode of condensation (which may include rectification) and the nature of the gas used to supply the heat of vaporization. If steam is used to supply the heat of vaporization and the vapors are totally condensed, the resulting hydrogen peroxide solution condensate will be more dilute than the hydrogen peroxide charged to the vaporizer. On the other hand, if a hot non-condensible gas is used to supply the heat of vaporization or if super-heated steam is used and the vapors are fractionally condensed, a condensate may be obtained which will have a higher concentration of hydrogen peroxide than that of the solution fed to the vaporizer. The concentration of hydrogen peroxide in the aqueous solution fed to the vaporizer is normally within the range of about 20 to 90 percent by weight.

From the foregoing it is apparent that the temperature and quantity of the super-heated steam or hot gas utilized to bring in the heat of vaporization may be varied over a wide range provided that it is above the boiling point of the hydrogen peroxide solution utilized. The minimum required temperature and quantity in any event is that sufficient to provide the heat required for complete vaporization of the peroxide solution fed into the vaporizer and may be readily calculated for any given rate of liquid feed. The following examples show the results obtained utilizing different conditions in operating the device of Figure 1.

EXAMPLES

Hydrogen peroxide vapor was produced by vaporizing commercial 35% and 50% hydrogen peroxide solutions in a vaporizer constructed according to the appended drawings. The hydrogen peroxide solution was fed into the vaporizer at room temperature (20 to 30° C.). The hot vaporizing gas was steam at about 15 pounds per square inch guage pressure. To test the efficiency of the process at any given time, the peroxide vapor was totally condensed and the condensate weighed. The following tabulation shows the quantities of steam and peroxide fed, steam temperature and efficiency in typical runs.

*Test runs*

|  | M–1 | M–2 | M–3 | M–4 | N–1 | N–2 | N–3 | N–4 |
|---|---|---|---|---|---|---|---|---|
| Peroxide Feed: |  |  |  |  |  |  |  |  |
| Lbs./hr | 12.6 | 10.8 | 4.6 | 8.6 | 8.5 | 8.0 | 11.5 | 7.5 |
| Percent $H_2O_2$ | 35.0 | 34.9 | 49.5 | 34.0 | 34.6 | 34.0 | 34.5 | 32.9 |
| Steam Feed: |  |  |  |  |  |  |  |  |
| Lbs./hr | 35.3 | 35.6 | 26.4 | 27.2 | 30.07 | 29.35 | 34.1 | 30.66 |
| Temp.[1] | 540 | 540 | 316 | 518 | 504 | 504 | 504 | 504 |
| $H_2O_2$ Vapor Temp.[1] | 115 | 117 | 114 | 116 | 146 | 148 | 142 | 145 |
| Total Condensate: |  |  |  |  |  |  |  |  |
| Lbs./hr | 46.5 | 45.6 | 30.6 | 35.0 | 38.0 | 37.0 | 45.0 | 37.5 |
| Percent $H_2O_2$ | 8.44 | 7.69 | 6.79 | 7.50 | 7.22 | 7.05 | 8.38 | 6.00 |
| Efficiency, percent | 89.0 | 93.0 | 91.3 | 90.0 | 93.3 | 96.0 | 95.0 | 91.0 |

[1] Degrees centigrade.

The foregoing description and examples are illustrative of the invention and it is evident that the principles of the invention may be applied with considerable variations in both the equipment and the procedure. An essential feature of the invention is that the liquid peroxide is not heated to its boiling point while in contact with any solid surface. Accordingly, the size and shape of the vapor enclosing shell 1 or vapor collecting means must be such that the atomized liquid particles, which may travel at a high rate of speed from the point of atomization, do not strike the surface of the vapor collecting shell before they have become completely vaporized. The size and shape of the vapor collecting means therefore depends on the direction of travel of the atomized particles from the point of atomization and their velocities. Bearing this principle in mind it is evident that various means for atomizing the liquid peroxide by contact with hot steam or gas may be utilized. For example, in place of the annular opening for the hot gas or steam illustrated by Figures 2 and 3, which forms a conical atomizing jet acting on a concentric jet of liquid, the vaporizing gas or steam may pass through a rectangular slot to impinge upon a stream of liquid peroxide which may be of any desired shape. The atomizing process may be designed to initially drive the atomized liquid particles in any desired direction, for example horizontally. If desired the atomizing device may be located in the bottom of a vapor collecting chamber and the atomized particles directed in an upward direction; also if desired, means may be provided for utilizing the hydrogen peroxide vapors in the chamber where they are formed. For example, materials to be reacted with the peroxide or to be treated with the peroxide vapor may be introduced into the vapor collecting chamber. Various other modifications and modes of utilizing the invention will be apparent.

A prime advantage of the present invention is that it affords a means of vaporizing hydrogen peroxide solutions at atmospheric pressure or above, and at relatively high temperatures, with little or no decomposition. It thus provides an efficient means for producing superheated peroxide vapors which are useful for bleaching or chemical reactions which are favored by temperature elevation. While the process may be operated at subatmospheric pressures if desired, it is generally preferable to employ pressures at or somewhat above one atmosphere, so as to force the vapor to a point of utilization.

We claim:

1. A process for the vaporization of hydrogen peroxide which comprises atomizing a stream of liquid hydrogen peroxide by contact with a stream of a hot gas having sufficient heat content to completely vaporize the peroxide, under conditions such that liquid peroxide at boiling point temperature is kept from contact with solid surfaces.

2. A process according to claim 1 wherein said hot gas is superheated steam.

3. A process for the vaporization of liquid hydrogen peroxide which comprises flowing together streams of liquid peroxide and a hot gas having sufficient heat content to completely vaporize the liquid peroxide at relative velocities sufficient to atomize the peroxide, while maintaining the liquid peroxide at a temperature below its boiling point until the moment of atomization, and collecting the resulting vapors in a space sufficiently large that the atomized liquid is completely vaporized before coming into contact with a solid surface.

4. A process for the vaporization of hydrogen peroxide comprising flowing a liquid peroxide jet axially into contact with a conical jet of superheated steam having sufficient heat content to completely vaporize the liquid, at respective velocities such that the liquid is atomized and does not reach its boiling point prior to atomization, and substantially completely vaporizing the atomized liquid out of contact with solid surfaces.

5. The process of claim 4, wherein the velocity of said liquid peroxide jet is such that the time of contact of the liquid flowing through a heated conduit is insufficient to heat the liquid to its boiling point before it reaches the point of atomization.

6. The process of claim 5 wherein the conical steam jet flows at substantially sonic velocity.

7. A process for the vaporization of hydrogen peroxide which comprises flowing superheated steam having sufficient heat content to completely vaporize the liquid hydrogen peroxide through an annular orifice so as to form a hollow conical stream, flowing a jet of liquid hydrogen peroxide axially into contact with said conical stream of steam, at such velocities that said jet of peroxide is atomized on contact with the steam and the temperature of said jet remains below the boiling point of the liquid until the moment of atomization; and substantially completely vaporizing the atomized liquid out of contact with solid surfaces.

8. A process according to claim 7 wherein said liquid hydrogen peroxide is a 20 to 90% aqueous solution.

References Cited in the file of this patent

UNITED STATES PATENTS

| | | |
|---|---|---|
| 2,461,988 | Kookjman | Feb. 15, 1949 |
| 2,556,047 | Standley | June 5, 1951 |
| 2,691,625 | Clarke | Oct. 12, 1954 |
| 2,703,139 | Rappleyea | Mar. 1, 1955 |
| 2,713,510 | Coanda | July 19, 1955 |